May 2, 1933.　　　G. LOWKRANTZ　　　1,906,931
FILM GATE FOR MOTION PICTURE CAMERAS

Filed May 20, 1929

INVENTOR.
GUNNE LOWKRANTZ.
BY
ATTORNEYS.

Patented May 2, 1933

1,906,931

UNITED STATES PATENT OFFICE

GUNNE LOWKRANTZ, OF BINGHAMTON, NEW YORK, ASSIGNOR TO AGFA ANSCO CORPORATION, OF BINGHAMTON, NEW YORK

FILM GATE FOR MOTION PICTURE CAMERAS

Application filed May 20, 1929. Serial No. 364,583.

My invention relates to a film gate for motion picture cameras and has for its primary object the provision of a film tensioning member adapted to resiliently engage and hold the motion picture film in flat relation to the exposure station of a camera and which member is readily and easily displaced with respect to such film and station in order that the film may be easily and quickly threaded therethrough for starting.

One object of my invention is to provide such a film gate which is normally resiliently urged into engagement with the film but which may be moved downwardly and outwardly against the tension of its springs to permit the ready insertion of the film, and which upon release will automatically return to its normal film engaging position.

Other objects and advantages in details will be apparent as the description proceeds, reference now being had to the figures of the accompanying drawing forming a part of this application and wherein like reference numerals indicate like parts.
In the drawing:—

Figure 1:
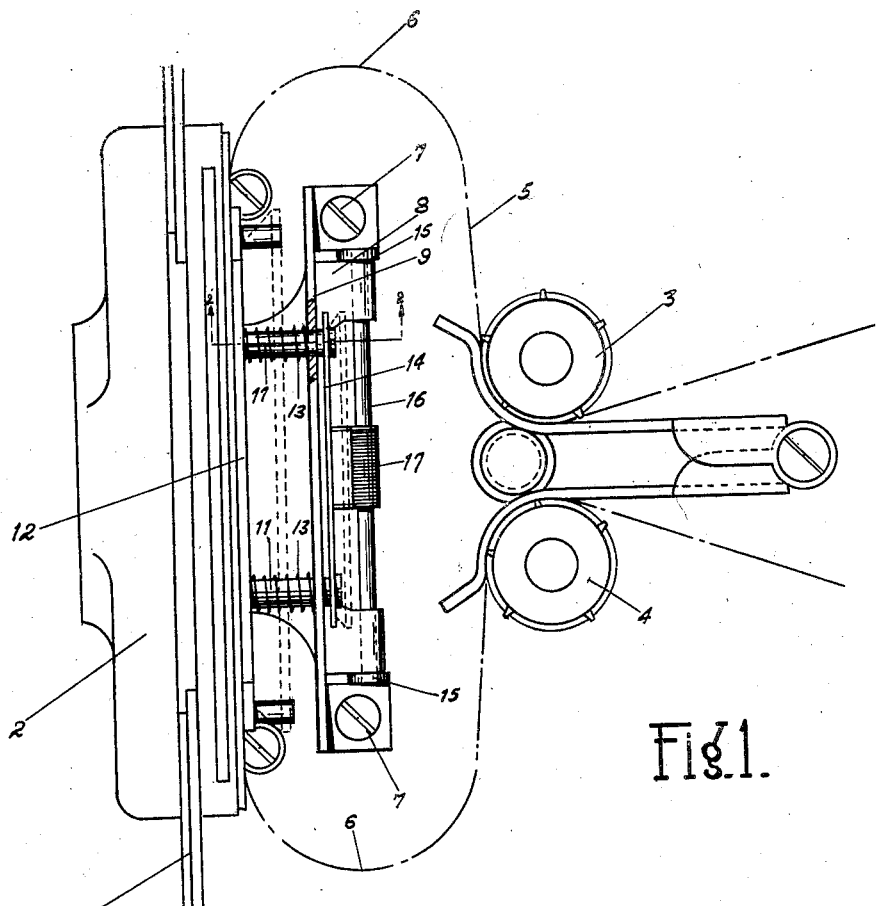
Figure 1 is a detail side view of the film gate and portion of the camera with which said gate is associated.

The illustration herein is more or less diagrammatic inasmuch as the invention resides in the film gate which is adapted for use in many designs and types of motion picture cameras, the details of which have no relation to this invention and have not therefore been shown in detail.

It may be assumed that the reference character 1 refers to a portion of the casing of a motion picture camera provided with the usual mounting 2 for lens and shutter and film moving apparatus. Feed sprockets 3 and 4 are provided for feeding the film 5 to the exposure station located within the casing 2 and to the intermittent film moving mechanism therein and not shown. Sprocket 3 tends to feed the film to such mechanism from a suitable source of supply and the sprocket 4 serves to feed the film away from such mechanism to a suitable take up reel. The film 5 is properly looped as at 6 before entering and after leaving the film gate and exposure station, to permit easy intermittent movement therethrough.

Suitably mounted upon the camera as by screws 7 at a point adjacent but spaced from the housing 2 is an angular bracket 8, a vertical side 9 of which is provided with two elongated recesses or openings 10 through which extend the pins 11. The pins 11 carry at their inner ends a flat presser pad 12 adapted to engage the rear side of the film 5 as it passes through the guided path provided for it in the rear of the housing 2. Coil springs 13 encircle the pins 11 between the flange 9 of the bracket and the presser pad 12 and tend to normally urge the presser pad into resilient engagement with the film 5.

Figure 2:
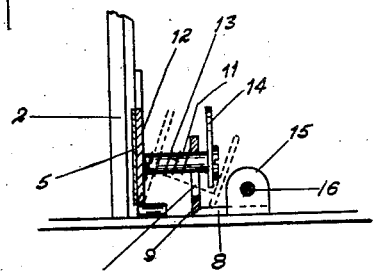
Figure 2 is a detail sectional view taken on the line 2—2 of Figure 1.

The opposite ends of the pins 11 extending through the openings 10 carry a finger piece 14 suitably secured thereto and serving as a means for pulling the pins outwardly or to the right in Figures 1 and 2, whereby the presser pad 12 may be pulled away from the film path. The bracket 8 is provided at each end with upstanding ears 15 serving as a bearing for a pintle 16 mounted upon which is a coiled spring 17, the ends of which engage the finger piece 14 in such manner as to normally hold the same and the pins 11 upwardly the full limit of the openings 10 in the flange 9. In such position, the presser pad 12 is in vertical position for full engagement throughout its width and length with the film 5. Pressing downwardly upon the finger piece 14, however, against the tension of the spring 17 will lower the pins 11 within the openings 10 in the flange 9 and permit the presser pad 12 to assume the position shown in dotted lines in Figure 2. This provides a relatively large space between the presser pad and the film gate or guide at the upper edge thereof and greatly facilitates the threading of the film through the camera. Naturally also the finger piece 14 may be moved to the right in Figures 1 and 2, thus further separating the presser pad 12 from the film guide whereby the film 5 may be quickly and easily threaded through the camera past the exposure station. With the film so threaded, the release of the finger piece 14 results in the coil spring 17 returning the presser pad to normal vertical position and the springs 13 moving such presser pad into flat engagement with the film 5.

Of course, changes may be made in details of construction and arrangement of parts without departing from the spirit and scope of my invention. I do not limit myself, therefore, to the exact structure herein shown and described other than by the appended claim.

I claim:

In combination with a film gate, a presser pad adapted for normal flat engagement with a film in said gate, pins on said pad, a bracket provided with elongated openings through which said pins extend, whereby said pad may be pivotally and slidably moved away from film engaging position and resilient means for resisting said pivotal and sliding movements.

In testimony whereof, I affix my signature.

GUNNE LOWKRANTZ.